UNITED STATES PATENT OFFICE.

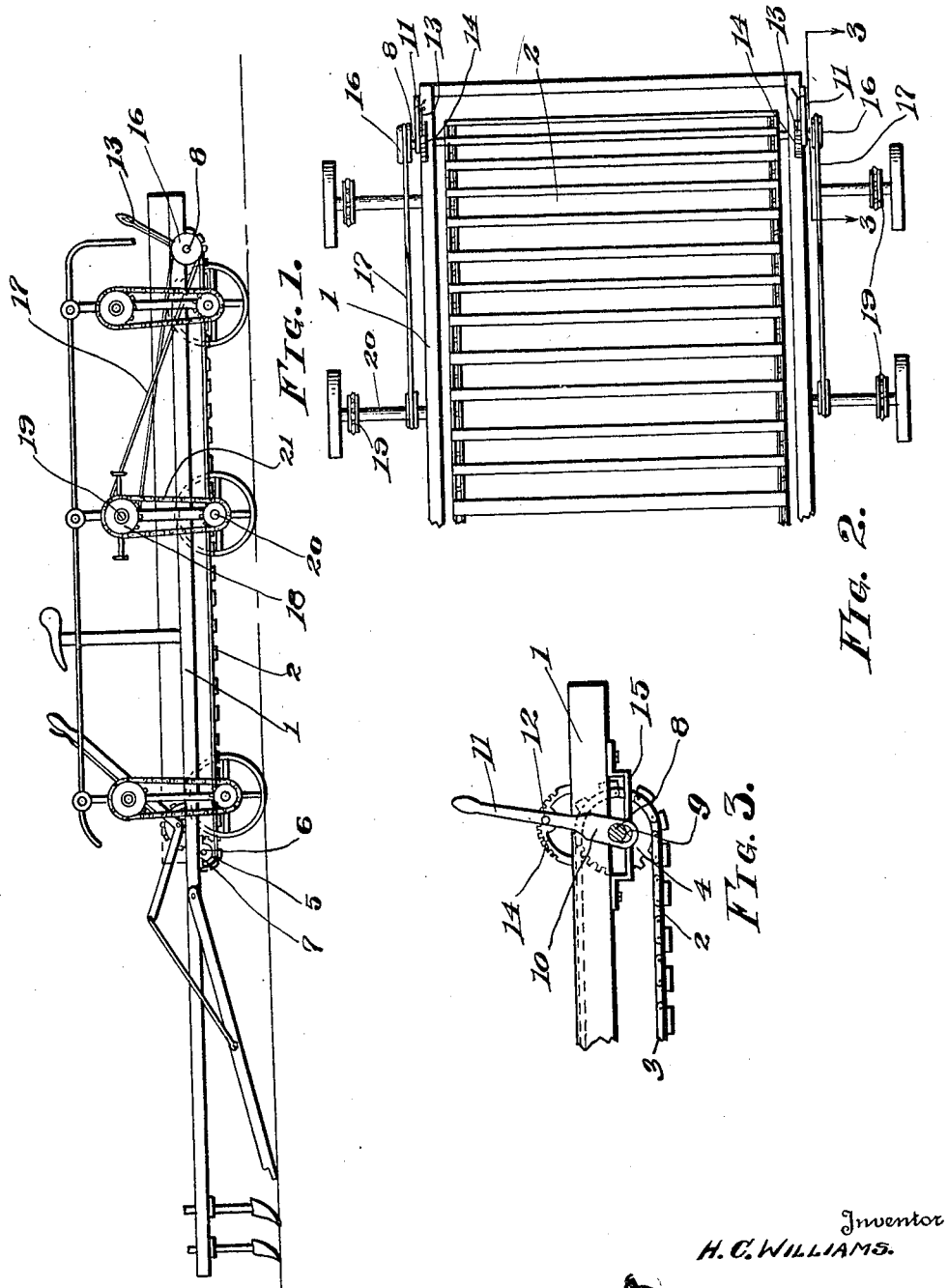

HENRY C. WILLIAMS, OF RAVINE, MISSISSIPPI.

CONVEYER-TENSIONING MEANS.

1,292,199.

Specification of Letters Patent.

Patented Jan. 21, 1919.

Application filed April 17, 1917. Serial No. 162,715.

*To all whom it may concern:*

Be it known that I, HENRY C. WILLIAMS, a citizen of the United States, residing at Ravine, in the county of Noxubee and State of Mississippi, have invented certain new and useful Improvements in Conveyer-Tensioning Means; and I do hereby declare the following to be a full, clear, and exact description of the invention, such as will enable others skilled in the art to which it appertains to make and use the same.

This invention relates to a conveyer structure, and more particularly to means for tensioning a conveyer such as is used upon peanut harvesters, or various other types of similar harvesters so that the conveyer may be slacked when desired, and shaken for cleaning the same.

Another object of this invention is to provide in a conveyer structure, one shaft over which the conveyer passes, which shaft is slidably carried by suitable guides and has a lever connected thereto so that upon the oscillatory movement of the lever, the shaft may be moved for slacking the conveyer to permit the conveyer to be shaken for cleaning the same, or by movement of the lever in a reverse direction, the tension of the conveyer may be tightened or increased, as desired.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:—

Figure 1 is a side elevation of a harvester, showing the invention applied thereto;

Fig. 2 is a fragmentary plan view of a harvester having the invention applied; and Fig. 3 is a section on the line 3—3 of Fig. 2.

Referring more particularly to the drawings, 1 designates a supporting frame of a peanut harvester, which supporting frame carries a conveyer structure 2. The conveyer structure 2 comprises a plurality of chains 3 which travel about sprockets 4 and 5. The sprockets 5 are carried by a shaft 6 which shaft is in turn rotatably supported by suitable bearings 7. The sprockets 4 are carried by a shaft 8, which shaft is rotatably mounted in oval shaped openings 9 formed in the lower enlarged end 10 of hand levers 11. The hand levers 11 are pivotally mounted as shown at 12 and they have dog mechanisms 13 carried thereby which coact with quadrants 14 for holding the hand levers in various adjusted positions. The supporting frame 1 has brackets 15 attached thereto through which the shaft 8 extends. The shaft 8 is slidably mounted in the brackets so that upon the pivotal movement of the hand levers 11 it may be moved toward or away from the shaft 6, depending upon the direction of movement of the hand levers. The conveyer structure may be slacked or tightened as desired.

Any suitable means may be provided for propelling the conveyer structure, in any ordinary manner. However, in Fig. 1 of the drawings, a pulley 16 is mounted upon the shaft 8 and a crossed belt 17 passes about the pulley 16 and about a pulley 18. The pulley 18 is carried by a shaft 19, which shaft is operatively connected to the axle 20 of the machine through the medium of a sprocket and chain connection as indicated at 21.

When it is desired to slack the conveyer for shaking the same so as to clean it, or for any other desired purpose, the upper ends of the levers 11 are moved rearwardly or away from the shaft 6 which will move the lower ends of the levers toward the shaft 6 and consequently loosen or slacken the conveyer, and when the upper ends of the levers 11 are moved toward the shaft 6, the conveyer will be tightened or tensioned.

While in the drawing, a particular type of harvester is illustrated, it is to be understood that the conveyer structure may be used upon any type of harvester or analogous structure without departing from the spirit of this invention.

In reducing the invention to practice, certain minor features of construction, combination and arrangement of parts may necessitate alterations to which the patentee is entitled, provided such alterations are comprehended within the scope of what is claimed.

What is claimed is:—

1. In a conveyer structure, the combination of a supporting frame; bearing members carried by the supporting frame; a shaft journaled through said bearing members; a pair of levers pivoted to said supporting frame and having elongated openings therein; a second shaft extending through the elongated openings of said levers; an endless conveyer arranged on said shaft; said levers being adapted to be rocked to regulate the tension of the conveyer; a pair of brackets arranged under the second-named conveyer and adapted to guide the horizontal movement of the shaft; and means to operate the conveyer.

2. In a conveyer structure, the combination of a supporting frame; bearing members carried by the supporting frame; a shaft journaled through said bearing members, quadrants arranged on said supporting frame; levers pivotally secured to the quadrants and having elongated openings in their ends; a second shaft extending through the elongated openings of said levers; an endless apron arranged over said shaft; said levers being adapted to be rocked to regulate the tension of the apron; a pair of brackets arranged under the second-named shaft and adapted to guide the horizontal movement of the same; and means to operate the conveyer.

3. In a device as set forth, a supporting structure, a shaft rotatably carried by said supporting structure, a pair of levers pivotally carried by said supporting structure, a shaft rotatably carried by the lower ends of said levers, a conveyer passing over said shafts, said levers adapted to be rocked for moving the shaft carried thereby toward or away from said first named shaft for regulating the tension of the conveyer.

4. In a device as set forth, a supporting structure, a shaft rotatably carried by said supporting structure, a pair of levers pivotally carried by said supporting structure, a shaft rotatably carried by the lower ends of said levers, a conveyer passing over said shafts, said levers adapted to be rocked for moving the shaft carried thereby toward or away from said first named shaft for regulating the tension of the conveyer, and brackets carried by said supporting frame for guiding the movement of said second named shaft.

5. In a conveyer structure, the combination of a supporting frame, a shaft rotatably mounted on said frame; a pair of levers pivoted to the sides of said supporting frame and having elongated openings in their lower ends; a second shaft extending through the elongated openings; sprockets arranged on the first and second-named shafts; and endless conveyers arranged on said sprockets; said levers being adapted to be rocked to regulate the tension of the conveyer; a pair of brackets arranged under said second-named shaft and adapted to guide the horizontal movement of the same; and means to operate the conveyer.

In testimony whereof I affix my signature in presence of two witnesses.

HENRY C. WILLIAMS.

Witnesses:
 A. T. DENT,
 E. D. HUNTER.

Copies of this patent may be obtained for five cents each, by addressing the "Commissioner of Patents, Washington, D. C."